US006996577B1

(12) United States Patent
Kiran et al.

(10) Patent No.: US 6,996,577 B1
(45) Date of Patent: Feb. 7, 2006

(54) METHOD AND SYSTEM FOR AUTOMATICALLY GROUPING OBJECTS IN A DIRECTORY SYSTEM BASED ON THEIR ACCESS PATTERNS

(75) Inventors: U. V. S. Ravi Kiran, Bangalore (IN); Shishir Nagaraja, Bangalore (IN)

(73) Assignee: Novell, Inc., Provo, UT (US)

( * ) Notice: Subject to any disclaimer, the term of this patent is extended or adjusted under 35 U.S.C. 154(b) by 526 days.

(21) Appl. No.: 10/082,850

(22) Filed: Feb. 25, 2002

(51) Int. Cl.
*G06F 17/00* (2006.01)

(52) U.S. Cl. ........................ 707/103 R; 707/9; 707/10; 707/104.1; 709/221; 709/229

(58) Field of Classification Search ............. 707/1–10, 707/103 R, 104.1, 100, 102; 709/221, 222, 709/223, 229
See application file for complete search history.

(56) References Cited

U.S. PATENT DOCUMENTS

| | | | | |
|---|---|---|---|---|
| 5,542,089 | A * | 7/1996 | Lindsay et al. | 707/2 |
| 6,446,061 | B1 * | 9/2002 | Doerre et al. | 707/3 |
| 6,598,054 | B2 * | 7/2003 | Schuetze et al. | 707/103 R |
| 6,728,752 | B1 * | 4/2004 | Chen et al. | 709/203 |
| 6,745,189 | B2 * | 6/2004 | Schreiber | 707/10 |
| 6,922,699 | B2 * | 7/2005 | Schuetze et al. | 707/103 R |
| 2003/0018652 | A1 * | 1/2003 | Heckerman et al. | 707/104.1 |

OTHER PUBLICATIONS

Douglass R. Cutting et al., Scatter/Gather: A cluster-based Approach to Browsing large Document Collection, 1992, ACM Press, pp. 318-329.*

Bing Liu et al.: Clustering Through Decission Tree Construction, Nov. 2000, ACM Press, pp. 20-29.*

P. Krishna et al.: A cluster-based Approach for Routing in Dynamic Networks, 1997, ACM Press, vol. 27, Issue 2, pp. 49-64.*

Tina Wong, et al., "An Evaluation of Preference Clustering in Large-Scale Multicast Applications", Department of Electrical Engineering and Computer Science, University of California, Berkeley, no date.

Bill Palace, "Data Mining: What is Data Mining?", Technology Note prepared for management 274A, Anderson Graduate School of Management at UCLA, Spring 1996.

Jiawei Han, et al., "Mining Frequent Patterns by Pattern-Growth: Methodology and Implications", SIGKDD Explorations. Copyright 2000 ACM SIGKDD, Dec. 2000, vol. 2, Issue 2, pp. 30-36.

(Continued)

*Primary Examiner*—Jeffrey Gaffin
*Assistant Examiner*—Jacques Veillard
(74) *Attorney, Agent, or Firm*—Haynes and Boone, LLP

(57) ABSTRACT

A method and system is provided for grouping one or more interested objects in a directory system based on their corresponding accesses patterns with regard to other objects. The access pattern of an interested object is defined by other objects which the interested object has accessed or by which the interested object has been accessed. First, each interested object is put in a singleton cluster, the singleton cluster having only one such object member. A first and second singleton clusters are merged into a third cluster if the ratio between an access pattern in terms of objects associated with each of the first and second singleton clusters and a combined access pattern associated with the third cluster conforms to a limit defined by a predetermined threshold ratio. The clusters then keep merging until no more clusters can be merged.

19 Claims, 2 Drawing Sheets

OTHER PUBLICATIONS

Soumen Chakrabarti, et al., “Mining the Web’s Link Structure”, IEEE Computer Society, Aug. 1999, vol. 32, No. 8, pp. 60-67.

Daniel Fasulo, “An Analysis of Recent Work on Clustering Algorithms”, Department of Computer Science & Engineering Technical Report # Jan. 3, 2002, Apr. 26, 1999.

David Gibson, et al. “Clustering Categorical Data: An Approach Based on Dynamical Systems”, VLDB 1998, Proceedings of 24rd International Conference on Very Large Data Bases, Aug. 24-27, 1998, New York City, New York, pgs 311-322.

* cited by examiner

METHOD AND SYSTEM FOR AUTOMATICALLY GROUPING OBJECTS IN A DIRECTORY SYSTEM BASED ON THEIR ACCESS PATTERNS

BACKGROUND OF THE INVENTION

The present invention relates generally to computer software, and more particularly, to an improved method and system for clustering directory objects into groups based on their similar access patterns to a directory system.

A directory system (or "directory" in short) maintains static relationships between various objects in a computer data system. For example, the directory system may be represented as a tree form with multiple levels therein, which defines a fixed structural relationship between any two objects in the directory system. The objects may represent users, files, or any other entities created by or associated with the directory system. Other than the seemingly structural relationships, there are implicit relationships among objects based on their interactions among them, which are dynamic in nature. In one of the simplest situations, for example, a particular user object may access a set of objects more frequently than other objects. In another situation, a particular object may be accessed only by certain user objects. In the present art, there is no method for determining such association among objects based on their dynamic activities in the directory system.

In the directory system, one problem known as the "Sparse Replica Configuration" has very much to do with the dynamic activities of the objects in the directory. A "sparse replica" is a server within a replica ring of a computer network system that holds specific objects and their selected attributes. The configuration of a sparse replica is further specified by a set of object classes and attribute types. Typically, configuring the sparse replica has to be manually performed by a directory administrator. The sparse replica is a useful arrangement from the perspective of data storage or synchronization if the size of an overall partition of data is huge and specific object classes and attribute types required are well known in advance at the server.

In a practical example, assuming a new sales office of a company is to be established at New York, it is found that all the users need, from the perspective of computer network support, is a functional address book. So, a Directory System Agent (DSA) is installed at the office into a "Sales" partition of the directory of the company, and the DSA and relevant replica servers serving the New York office are configured to only hold (e.g., usernames, email IDs and corresponding telephone numbers) information necessary for the address book and incorporated as attributes to the directory tree.

Later on, when the users in the office install new applications that need more than just email and telephone number attributes, the administrator has to add additional attributes to the replica configuration of all remote replica servers. If more applications are added and additional attributes are needed, the administrator is called in again. Each time the administrator is involved, he needs to make a decision as to how many users are using these attributes and whether it is worth having these attributes located on the main DSA or having the user's application clients fetch them from a remote/sparse replica server. Based on his decision, the configuration of the sparse replica servers must change accordingly. It is thus understood that there is a huge amount of administrative effort required to configure the sparse replica servers and keep the configuration in synchronization with the actual needs, for optimal resource usage. Moreover, to determine the access pattern of each attribute and object is a monstrous task.

Assuming that the NY office and another office (e.g., Los Angles) access some common set of attributes (which may change from time to time) which are available from one sparse replica server physically located somewhere in California. Since there is not enough demand for these attributes at either of the two locations (NY, LA) to have a separate server for each office, it may be useful to have a sparse replica server installed physically along the common network route to both these offices, wherein the sparse replica server is as close to both of them as possible. A sparse replica server thus needs to be placed in a strategic "location" based on the activities of the objects accessed.

Needless to say that configuration of a sparse replica is a continuous activity driven by the needs of the users of the directory. This inevitably leads to administrative activities that are, by their very nature, expensive because of the manual involvement of the administrators. Also the administrators are often very busy due to the tremendous task of maintaining the entire directory. Therefore, there is no guarantee that all the requests for configuring the sparse replica will be taken cared of in a timely fashion. For example, it is likely that requests from an "uninfluential" section of users or requests for temporal, though important, changes in the configuration may go unheeded. In many cases, the users may see the difference in the response time between directory operations depending on the existence of attributes in the configuration of the local sparse replica because directory operations involving replicated attributes are faster than those involving attributes which are not replicated.

In order to address this sparse replica configuration problem, a method is needed that would collect and analyze directory access patterns and automatically recommend both the configuration and the location of a sparse replica to improve system performance.

SUMMARY OF THE INVENTION

A method and system is provided for grouping one or more interested objects in a directory system based on their corresponding accesses patterns with regard to other objects. The access pattern of an interested object is defined by other objects which the interested object has accessed or by which the interested object has been accessed. First, each interested object is put in a singleton cluster, the singleton cluster having only one such object member. A first and second singleton clusters are merged into a third cluster if the ratio between an access pattern in terms of objects associated with each of the first and second singleton clusters and a combined access pattern associated with the third cluster conforms to a limit defined by a predetermined threshold ratio. The clusters then keep merging until no more clusters can be merged.

In the computer network operable with a directory system, the system disclosed herein can apply to any directory-enabled application whose access pattern is a piece of valuable information. The provided system can profile users, makes recommendations or personalizes contents based on corresponding access patterns.

In one example, the present disclosure provides a resource clustering mechanism which recommends a change to configure replica servers based on the need of users. In another example, a method and system is provided for clustering users into user communities based on similarities in access patterns.

DESCRIPTION OF THE PREFERRED EMBODIMENT

Figure 1:
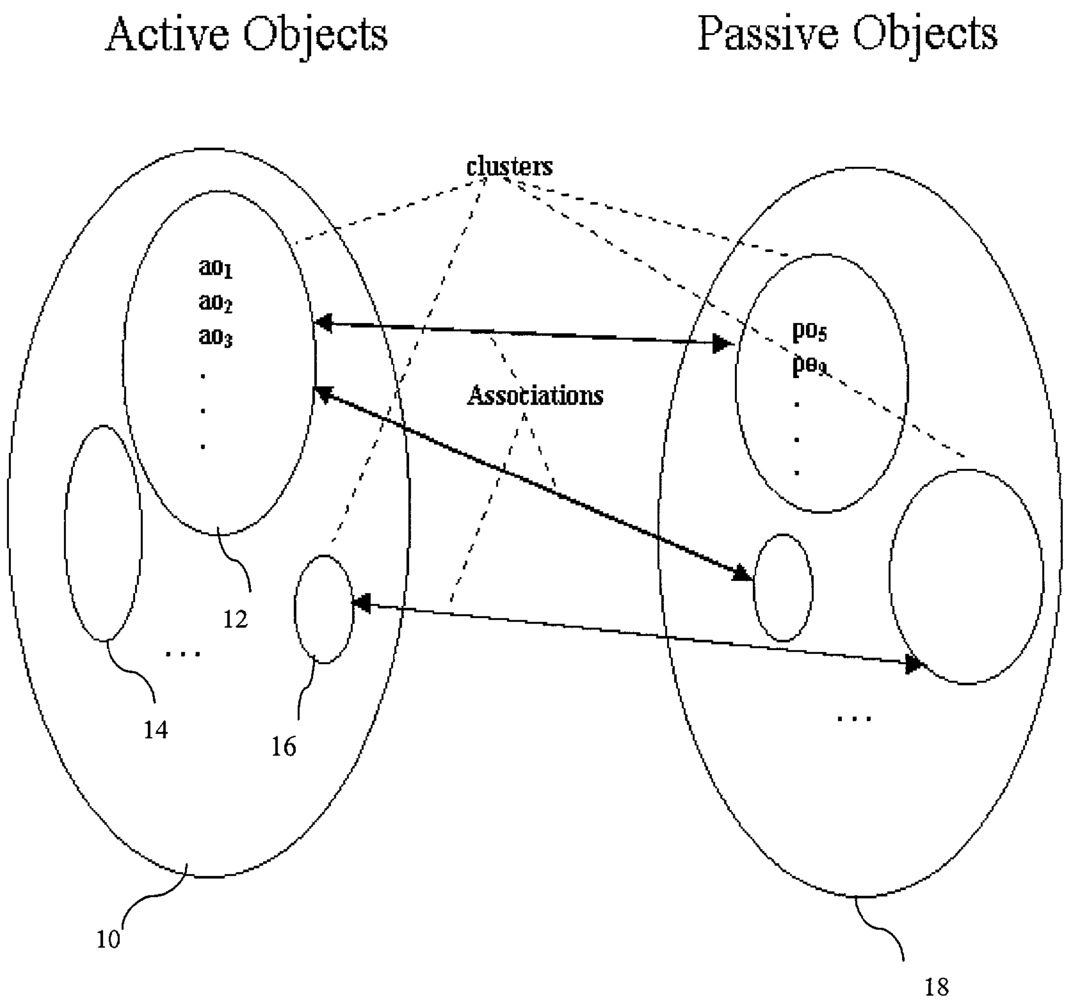
FIG. 1 illustrates various object clusters and their associations with each other according to one example of the present disclosure.

The present disclosure relates closely with a directory system, and more particularly, works with any directory-enabled applications to profile objects or users. Consequently, the method and system disclosed herein makes recommendations automatically to take appropriate actions by the directory system based on the access patterns of relevant objects.

In any interaction involving two objects in a computer data system, there is an actor who performs the action and there is another entity on which the action is performed. For example, when a user accesses a printer, the user object is the actor and the printer object is the acted upon entity. For the purposes of this disclosure, the actors are referred to as active objects, and the acted upon entities as passive objects. Although in many situations below, the use of the term "object" may be for a directory object, it is understood that passive and active objects could also refer to other network entities or elements such as network addresses, attributes, object classes etc.

In essence, dynamic access patterns would reveal preferences of a user or the access frequency (or popularity) of an object. The method described below clusters both active and passive objects in order to find out the preferences of a community of objects. The access data of an active object is defined to be a list of passive objects which the active object has accessed. The access data of a passive object is a list of active objects which have accessed the passive object.

Several algorithms are involved which cluster users into communities based on the similarity of their patterns for accessing passive objects. The definition of similarity is based on the premise that users of a community would exhibit a tendency to access a common set of passive objects. In several entirely disjoint communities having a single active object in each community, a predetermined algorithm will iterate to merge two communities together until no larger community based thereon can be further constructed. One of the criteria to merge two communities is based on the ratio of common objects in their passive object list. If the ratio is greater than a threshold, the communities are merged. On the other hand, an actor departs from a community that it initially belongs to if the number of common passive objects accessed has reduced below a threshold.

For the purposes of this disclosure, a "cluster" is a set of one or more active or passive objects, and an active cluster is a cluster with similar active objects, while a passive cluster is a cluster with similar passive objects. A working set for an active object contains passive objects that the active object has accessed, and a working set for a passive object is a group of active objects that have accessed the passive object. A working set of size 'n' holds, at the most, 'n' latest elements/objects. For example, if the accesses made to a pool of passive objects are in a sequence of {a, b, c, a, a, b, a}, and if the size of the working set is 3, which indicates only the last three objects are included, the working set of this pool of objects can be found as follows:

The working set for {a} is [a].
The working set for {a, b} is [a, b].
The working set for {a, b, c} is [a, b, c].
The working set for {a, b, c, a} is [b, c, a].
The working set for {a, b, c, a, a} is [c, a].
The working set for {a, b, c, a, a, b} is [a, b].
The working set for {a, b, c, a, a, b, a} is [a, b].

As it is shown above, if a particular object is repetitively accessed, the working set only recognizes it once. In addition, when an active object accesses a passive object, the passive object remains in the "memory" of the active object for some time although it remembers only the latest data. In storing the access patterns for any active objects and its associated passive objects, only the working set is stored, as the old data doesn't reflect the changing taste or behavior of the active or passive objects.

FIG. 1 illustrates various object clusters and their associations with each other. It is assumed that the active object group 10 contains various clusters 12–16 of different sizes, and so do the passive object group 18.

In a more mathematic representation, if an active object $ao_i$ has accessed the objects $po_1, po_2, \ldots, po_m$ then its access pattern, $A_I$ is defined to be:

$$A_I=\{po_1, po_2, \ldots, po_m\}$$

Similarly, if the active objects $ao_1, ao_2, \ldots, ao_m$ have accessed the passive object $po_i$, then its access pattern, $P_i$ is $$P_i=\{ao_1, ao_2, \ldots, ao_m\}$$

It is contemplated that certain cluster may only have one object, and such cluster is referred to as a singleton cluster. It is also defined that the access pattern of a cluster, which is also known as a cluster access list, is the union of the access patterns of all its member objects. For example, if objects A, B and C are the members of a cluster and A's access pattern is {x, y, z}, B's access pattern is {x, y} and C's access pattern is {y, z, p}, the cluster access list of that cluster is:

$$\{x,y,z\}\cup\{x,y\}\cup\{y,z,p\}=\{x,y,z,p\}$$

Further, another list generally referred to as an "Associations of a Cluster" contains the names of other related clusters which in turn contain the objects of the cluster access list. For example, if an active object cluster AC's cluster access list is {P1, P2, P3} and these passive objects can be found in passive clusters PC1 and PC2, then it is said that PC1 and PC2 are the associations of AC.

Based on the above described definitions of objects and their access patterns, if $ao_1, ao_2, \ldots, ao_n$ are the active objects and $P_1, P_2, \ldots, P_n$ are the access patterns of all the active objects in the cluster, these active objects can be in the same cluster if and only if for each i=1 to n, $$|P_i|/|(P_1\cup P_2\cup \ldots P_n)|>\tau,$$

where 'τ' is a constant referred to as a threshold ratio and $|P_i|/|(P_1\cup P_2\cup \ldots P_n)|$ is referred to as an "access ratio." It is understood that, in this example, although the access ratio shown above should be larger than τ, it is easily define the access ratio to be $|(P_1\cup P_2\cup \ldots P_n)|/|P_i|$, and then the access ratio is expected to be smaller than a threshold limit. The test represented by the above formula to examine whether the access ratio conforms to the threshold limit is also referred to as a "threshold ratio rule." Therefore, a particular object can belong to a cluster as long as its existence in the cluster does not violate the threshold ratio rule.

According to the present disclosure, all the active and passive objects are put in singleton clusters initially. Any two clusters can be merged into a single cluster if after merging it will not violate the threshold ratio rule. A cluster is selected and all other clusters then attempt to be merged with that selected cluster. Merging two clusters is done only if the threshold ratio rule would be conformed to for the merged cluster after the merger is completed. The above step is performed for all clusters (both active and passive) until no clusters can be merged (i.e., all associations for each cluster (both active and passive) are found).

When an active object accesses a passive object, this action may or may not affect the clusters involved. If the threshold ratio rule of the corresponding cluster (both active and passive) is not violated, there is no need to alter the clusters. But if either the active cluster or the passive cluster is affected (i.e., the threshold ratio rule for the corresponding cluster is violated), the object responsible for the violation of the rule is removed from the cluster and put in a singleton cluster. This singleton cluster is merged with another suitable cluster if possible. To maintain the "stability" of a cluster, the access ratio of the contained objects must conform to the threshold ratio rule.

Similarly, when a new passive or active object is added, it is put in a singleton cluster. Since it doesn't have any access patterns, the singleton cluster needs not be merged with any other clusters. But if the new active object starts to access any passive object, or if some active object accesses the new passive object, the singleton cluster might start to merge with other clusters. Consequently, the associations of clusters are re-determined.

Figure 2:
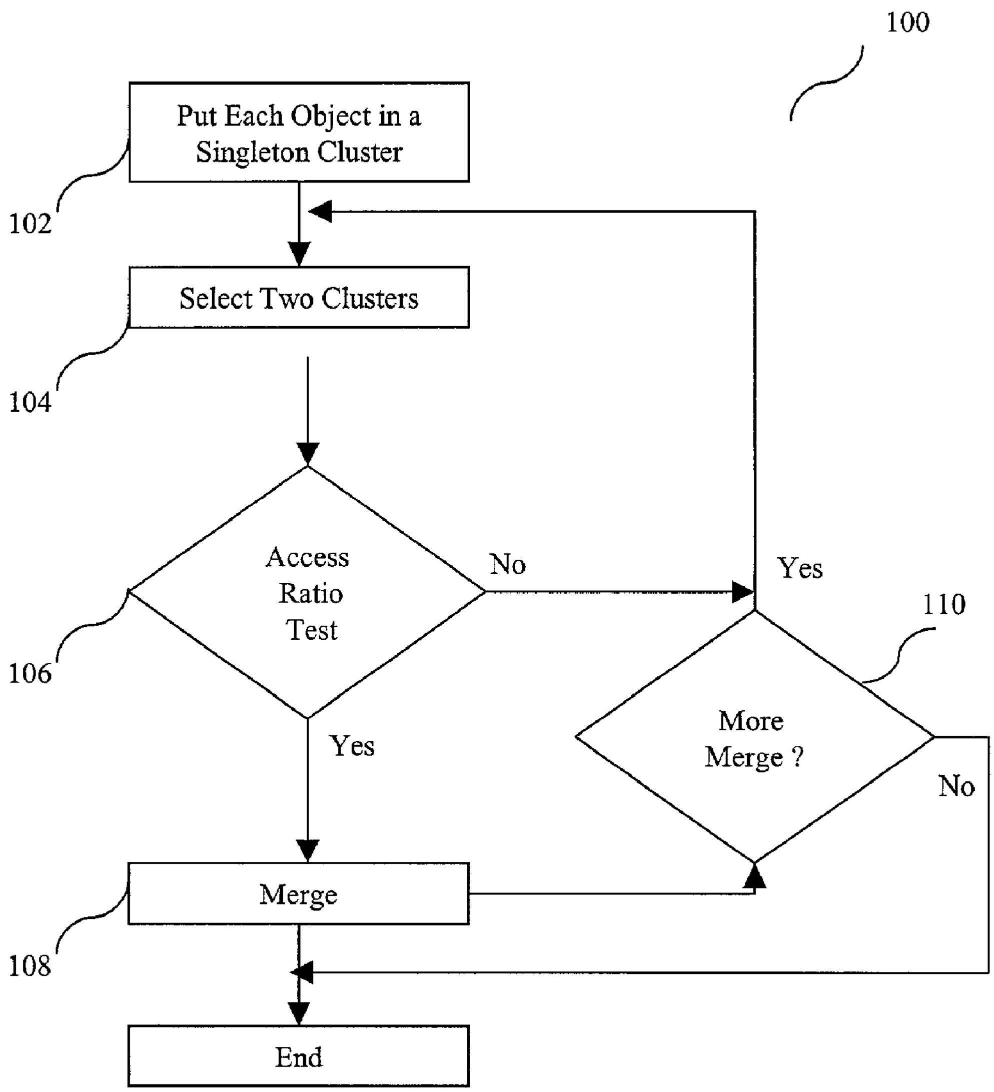
FIG. 2 is a flow diagram illustrating a method for grouping one or more interested objects according to one example of the present invention.

FIG. 2 is a flow diagram 100 illustrating the method for grouping one or more interested objects as described above. In step 102, each interested object is put in a singleton cluster. As stated above, the access pattern of an interested object is defined by other objects which the interested object has accessed or by which the interested object has been accessed. After a first and second clusters (e.g., singleton clusters initially) are selected in step 104, an access ratio test is conducted in step 106 to examine whether the access ratio conforms to a predetermined threshold. The access ratio is defined to be the ratio between an access pattern in terms of objects associated with each of the first and second singleton clusters and a combined access pattern associated with a third cluster assuming the first and second clusters are going to merge. If the access ratio test is positive, the first and second clusters are merged in step 108. On the other hand, if the access ratio test is negative, the two clusters are not going to merge, and two different clusters are selected again (step 104) to see whether there is a possibility to consummate a merger. This process continues until there is no more merger possible (step 110).

As stated above, to calculate the access pattern of each attribute and object is a monstrous task, one practical alternative is to monitor the access patterns of clusters of attribute types and object classes instead. In the context of sparse replica configuration, the clustering mechanism as described above can be implemented treating users as active objects and attribute types and object classes as passive objects. If it is found that a directory-enabled application accessed by a community of users, which involves searches/updates/compares instances of object classes and/or attribute types, is not hosted on a sparse replica server at any time, the configuration of the sparse replica server could be automatically updated by using information generated by the method described above. Communities of users and communities of attributes and object classes are then formed, which in turn will form the configuration of a sparse replica server.

In case the location of the sparse replica needs to be determined, the network address of the access can be used as the active object and the attribute type as the passive object. As such, networks that frequently access a given subset of attributes will be identified, the information of which could be used to guide the placement of sparse replicas in the network.

Similarly, assuming a multimedia sever has a fixed number of multicast channels, and the access of a particular channel needs to be identified and assigned to a user of the server based on their personal interests. If the users are clustered into communities based on their prior access patterns representing their personal interests while using the server, the channel can be easily identified. In the context of a web portal wherein multiple users are accessing various classes of information, and the personalized web-surfing preferences of the users are stored in a directory system. By periodically performing the clustering and re-clustering, communities of users of similar access patterns can be identified, and thus relevant information can be provided based thereon by the portal service provider.

It will be recognized that other modifications, changes, and substitutions are intended in the foregoing disclosure, and in some instances, some features of the disclosure will be employed without the corresponding use of other features. Accordingly, it is appropriate that the appended claims be construed broadly and in a manner consistent with the scope of the disclosure.

What is claimed is:

1. A computer-executable method for grouping one or more interested objects in a directory system based on their corresponding access patterns with regard to other objects, wherein an access pattern of an interested object is defined by other objects which the interested object has accessed or by which the interested object has been accessed, the method comprising:

putting each interested object in a singleton cluster, the singleton cluster having only one such interested object;

performing an access ratio test based on first and second singleton clusters to calculate an access ratio; and merging the first and second singleton clusters into a third cluster only if the access ratio conforms to a predetermined threshold wherein the access ratio is defined as a ratio between an access pattern of each interested object of the first and second singleton clusters and a combined access pattern, and wherein the combined access pattern is defined in terms of interested objects that would be associated with the third cluster if the first and second singleton clusters were merged, wherein the step of merging is repeated until no more clusters can be merged.

2. The method of claim 1 further comprising modifying each cluster, after no more clusters can be merged, if at least one of the cluster's objects' access activities has changed the corresponding access pattern associated with the object such that the Access Ratio associated with the cluster does not conform to the predetermined threshold.

3. The method of claim 2 further comprising:

removing the object causing the non-conformance of the predetermined threshold from its cluster into a fourth singleton cluster; and merging the singleton cluster with other clusters to form additional merged clusters if Access Ratios of the additional merged clusters conform to the predetermined threshold.

4. The method of claim 1 wherein the access pattern of the interested object is stored as a working set containing one or more other objects.

5. The method of claim 4 wherein the working set contains a predetermined number of other objects most recently accessed by or having accessed the interested object, which are not redundant among themselves.

6. The method of claim 1 further comprising determining an access list of each cluster after all the mergers have been done.

7. The method of claim 6 further comprising determining an association list of each cluster containing one or more clusters that share one or more objects therewith.

8. Computer-executable instructions for grouping one or more interested objects in a directory system based on their corresponding access patterns with regard to other objects, wherein an access pattern of an interested object is defined by other objects which the interested object has accessed or by which the interested object has been accessed, the instructions comprising instructions for:

putting each interested object in a singleton cluster, the singleton cluster having only one such interested object, performing an access ratio test based on first and second singleton clusters to calculate an access ratio; and merging the first and second singleton clusters into a third cluster only if the access ratio conforms to a predetermined threshold wherein the access ratio is defined as a ratio between an access pattern of each interested object of the first and second singleton clusters and a combined access pattern, and wherein the combined access pattern is defined in terms of interested objects that would be associated with the third cluster if the first and second singleton clusters were merged, wherein the merging is repeated until no more clusters can be merged.

9. The computer-executable instructions of claim 8 further comprising modifying each cluster, after no more clusters can be merged, if at least one of the cluster's objects' access activities has changed the corresponding access pattern associated with the object such that the Access Ratio associated with the cluster does not conform to the predetermined threshold.

10. The computer-executable instructions of claim 9 further comprising instructions for:

removing the object causing the non-conformance of the predetermined threshold from its cluster into a fourth singleton cluster; and merging the fourth singleton cluster with other clusters to form additional merged clusters if Access Ratios of the additional merged clusters conform to the predetermined threshold.

11. A computer system having a plurality of instructions for grouping one or more interested objects in a directory system based on their corresponding access patterns with regard to other objects, wherein an the access pattern of an interested object is defined by other objects which the interested object has accessed or by which the interested object has been accessed, the system comprising:

instructions for putting each interested object in a singleton cluster, the singleton cluster having only one such interested object;

performing an access ratio test based on first and second singleton clusters to calculate an access ratio; and merging the first and second singleton clusters into a third cluster only if the access ratio conforms to a predetermined threshold wherein the access ratio is defined as a ratio between an access pattern of each interested object of the first and second singleton clusters and a combined access pattern, and wherein the combined access pattern is defined in terms of interested objects that would be associated with the third cluster if the first and second singleton clusters were merged, wherein the step of merging is repeated until no more clusters can be merged.

12. The system of claim 11 further comprising instructions for modifying each cluster, after no more clusters can be merged, if at least one of the cluster's objects' access activities has changed the corresponding access pattern associated with the object such that the Access Ratio associated with the cluster does not conform to the predetermined threshold.

13. The system of claim 11 further comprising instructions for:

removing the object causing the non-conformance of the predetermined threshold from its cluster into a fourth singleton cluster; and merging the fourth singleton cluster with other clusters to form additional merged clusters if Access Ratios of the additional merged clusters conform to the predetermined threshold.

14. The system of claim 11 further comprising instructions for providing a working set containing one or more other objects representing the access pattern of the interested object.

15. The system of claim 14 wherein the working set contains a predetermined number of other objects most recently accessed by or having accessed the interested object, which are not redundant among themselves.

16. The system of claim 11 further comprising instructions for providing an access list of each cluster after all the mergers have been done containing all objects being accessed by the objects in the cluster or objects having accessed the objects in the cluster.

17. The system of claim 11 further comprising instructions for providing an association list of each cluster containing one or more clusters that share one or more objects therewith.

18. A computer-executable method for grouping objects in a computer directory system based on an access pattern of each object, wherein the access pattern identifies other objects that have accessed the object or have been accessed by the object, the method comprising:

selecting first and second singleton clusters from a plurality of singleton clusters, wherein each singleton cluster contains only one object;

performing an access ratio test based on the first and second singleton clusters, wherein the access ratio test indicates whether a ratio of an access pattern of objects contained in the first and second singleton clusters and a combined access pattern associated with a group cluster that would be formed by merging the first and second singleton clusters conforms to a predetermined threshold;

merging the first and second singleton clusters to form the group cluster if the access ratio test indicates that the first and second singleton objects should be merged; and repeatedly performing the access ratio test based on a pair of singleton clusters, a pair of group clusters, or a pair of singleton and group clusters, and merging each pair that the access ratio test indicates should be merged until all pairs indicated by the access ratio test as able to be merged have been merged.

19. The method of claim 18 further comprising:

identifying a change in the access pattern of an object contained in a singleton or group cluster; and removing the object from the singleton or group cluster if the access ratio of the cluster no longer conforms to the predetermined threshold due to the change.

* * * * *